United States Patent [19]

Schreiner et al.

[11] Patent Number: 5,713,964
[45] Date of Patent: Feb. 3, 1998

US005713964A

[54] LOW SMOKE COMPOSITION AND FIREFIGHTER TRAINING PROCESS

[75] Inventors: James Louis Schreiner, Cypress, Tex.; Michael Edward Moir, Corte Madera, Calif.; Rupert David Holmes-Smith, Calgary, Canada; Charles Francis Ruigrok, Aurora, Canada; James Brian Mitchell, London, Canada

[73] Assignee: Exxon Chemical Patents Inc., Houston, Tex.

[21] Appl. No.: 570,053

[22] Filed: Dec. 11, 1995

Related U.S. Application Data

[63] Continuation-in-part of Ser. No. 142,716, Oct. 25, 1993, abandoned.

[51] Int. Cl.$^6$ .......................................... C10L 1/30
[52] U.S. Cl. .................................. 44/355; 44/361
[58] Field of Search ............................. 44/355, 361

[56] References Cited

U.S. PATENT DOCUMENTS

| | | | |
|---|---|---|---|
| 3,294,685 | 12/1966 | Stevens et al. | 44/361 |
| 3,341,311 | 9/1967 | Pedersen | 44/361 |
| 3,644,073 | 2/1972 | Goldsmith . | |
| 4,389,220 | 6/1983 | Kracklauer | 44/361 |
| 4,908,045 | 3/1990 | Farrar . | |
| 4,998,876 | 3/1991 | Farrar . | |

FOREIGN PATENT DOCUMENTS

| | | |
|---|---|---|
| 0 359 390 A1 | 3/1990 | European Pat. Off. . |
| 652944 A | 3/1979 | U.S.S.R. . |
| 1 477 806 | 1/1975 | United Kingdom . |

OTHER PUBLICATIONS

Patent Abstracts of Japan vol. 010, No. 185 (C-357), 27 Jun. 1986 & JP 61 031492 A (Idemitsu Petrochem Co Ltd), 13 Feb. 1986.

"Smoke Reduction from Burning Crude Oil Using Ferrocene and its Derivatives" by the Combustion Industry published 1991; Elsevier Science Pubishing Co., Inc., pp. 179–184 (1991), month unavailable.

*Primary Examiner*—Jacqueline V. Howard
*Attorney, Agent, or Firm*—John F. Hunt

[57] ABSTRACT

A low smoke firefighter training hydrocarbon composition and process. The compositions preferably contain alkanes and avoid aromatics. Ferrocene or certain other volatile iron compounds are incorporated in the compositions which are readily ignitable but not dangerously so. The process enhances the firefighter training while reducing smoke and soot to the surrounding environment.

21 Claims, No Drawings

LOW SMOKE COMPOSITION AND FIREFIGHTER TRAINING PROCESS

CROSS REFERENCE

This application is a continuation-in-part of U.S. Ser. No. 08/142,716, filed Oct. 25, 1993, now abandoned.

FIELD OF THE INVENTION

This invention relates generally to a liquid composition usable in firefighter training. The composition, upon combustion, produces low levels of soot and other environmentally undesirable combustion products.

BACKGROUND OF THE INVENTION

Firefighters need to be trained in the skills and equipment for combating large fires. Fire training at major airports servicing commercial airlines needs to be particularly intensive because of the potential severity of jet fuel fires and the short time available to rescue aircraft crash victims. Training programs are carried out at military bases, civilian airports, commercial fire training schools such as Texas A&M University, Lambton College, in Sarnia, Ontario, as well as at a multitude of private, less formal training facilities.

One of the serious problems associated with the training schools, particularly those involving large training fires, is the amount of smoke, soot, and contaminants generated by the fires. Such training fires are objectionable not only from an environmental standpoint, but also present a nuisance for the firefighters as well as residents in the area.

As described and claimed herein, the present invention involves a unique liquid composition useful in fire training activities. The composition upon combustion produces low levels of smoke, soot, and other undesirable combustion products.

Soot, particulate, and chemical emissions from the combustion of fuels in various engines and other enclosed or controlled environments has been the topic of extensive investigation. The prior art in this area teaches us that the use of ferrocene in typically small proportions (up to 10,000 ppm) in liquid hydrocarbon fuels, including diesel fuels, materially improves the ignition and combustion characteristics of the fuels, decreasing their tendency to form soot in the exhaust gases and solid carbonaceous deposits in the engine.

U.S. Pat. No. 4,908,045, 4,998,876, U.K. 1477806, and EPA 0359390 disclose the use of ferrocene as a fuel additive. However, because the deliberate combustion of liquid hydrocarbon fuels in open, unwicked, and comparatively uncontrolled environments is a relatively uncommon practice, there has been very limited investigation of the products of combustion or their control or limitation. Furthermore, this practice has not been the subject of significant regulation beyond the control of either carrying out the practice or not. Examples of such activities include slash burning in the forest industry, in-situ burning of crude oil spills [see "Smoke Reduction from Burning Crude Oil Using Ferrocene and its Derivatives", by the Combustion Industry, published in 1991 by Elsevier Science Publishing Co., Inc., pages 179–184 (1991)], and the burning of fuels for firefighter training. In this latter case of burning fuels for firefighter training, the increasing constraints around carrying out the practice have required the industry that provides fire fighting services to pursue other more costly means to provide firefighters adequate training. This invention provides a low cost alternative.

SUMMARY OF THE INVENTION

The invention is a low smoke composition comprising a liquid hydrocarbon, said composition having a flash point of 20°–125° F. and a smoke point of at least 50 mm.

The invention is also a process comprising training firefighters with an ignited hydrocarbon composition having a smoke point of at least 50 mm.

The smoke point is determined by ASTM method #D 1322-90 Section 5.1.

It has surprisingly been discovered that a liquid composition comprising a paraffinic liquid hydrocarbon containing an effective amount of a volatile iron compound, when burned in an open flame, generates extremely low smoke, soot, and other undesirable combustion products, making it ideally suited for fire training activities.

DESCRIPTION OF THE PREFERRED EMBODIMENTS

In a preferred embodiment, the liquid composition comprises:

(a) a substantially paraffinic liquid hydrocarbon (i.e. at least 75 wt. % of which is a normal alkane or normal alkane mixture containing from 6 to 16 carbon atoms); and (b) an effective amount of a volatile iron compound dissolved or dispersed in the liquid hydrocarbon. The volatile iron compound is selected from the group consisting of iron pentacarbonyl, ferrocene, and ferrocene derivatives.

In another preferred embodiment, the composition contains from 0.1 to 10 wt. %, preferably from 0.2 to 5 wt. % of the volatile iron compound, and will be composed of at least 90%, and most preferably 95 wt. % of the normal alkane constituents. The flash point (TCC) of the liquid hydrocarbon will depend on several factors, but flash points in the range of 0° F. to 200° F. should be satisfactory for most applications. Preferred flash point ranges are 30° F. to 160° F., and 50° F. to 150° F. Most preferred is 20° F. to 125° F.

The liquid composition may be used in firefighter training involving the steps of depositing the composition in an open pit or basin or container, igniting the composition, and conducting fire fighting drills using the flame resulting from burning the composition.

According to the present invention, the chemical composition, when introduced, by whatever means, into an open pit or bermed area and ignited for the purpose of training firefighters, is useful in reducing the amount of soot and unsightly black smoke while at the same time providing the advantage in improving the overall air quality through the reduction in the quantities of polycyclic aromatic hydrocarbons (or polynuclear aromatics, PNA's) and volatile organic compounds. The chemical hydrocarbon composition preferably comprises a volatile iron compound and a liquid hydrocarbon which is low, and preferably substantially free of aromatic constituents. Aromatics content in the hydrocarbon composition and process of the invention are preferably less than 5.0 wt %, more preferably below 1.0 wt % of the composition, most preferably below 0.1 wt %. Some suitable compositions contain as low as 0.001–0.0001 wt % aromatics.

While the volatile iron compound may be iron pentacarbonyl Fe(CO)5, a ferrocene compound is preferred. The ferrocene compound including ferrocene derivatives may be represented by the following formula:

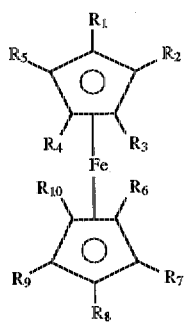

wherein each $R_1$, $R_2$, $R_3$, $R_4$, $R_5$, $R_6$, $R_7$, $R_8$, $R_9$, $R_{10}$, independent of the others, is selected from the group consisting of hydrogen, alkyl, cycloalkyl, aryl, or heterocyclic functional groups. The derivative is preferably selected such that its volatility allows it to be consumed in the burning process at a rate comparable to that of the linear hydrocarbon mixture. The ferrocene derivatives include di(indenyl)iron.

In the above formula, the term "alkyl" refers to an alkyl group branched or straight chain of 1 to 10 carbon atoms, such as methyl, ethyl, propyl, n-butyl, t-butyl, hexyl, or heptyl. The term "cycloalkyl" refers to lower cycloalkyl groups of 5 to 7 carbon atoms, such as cyclopentyl, cyclohexyl or methyl cyclohexyl. The term "aryl" refers to an organic radical derived from an aromatic compound by the removal of one hydrogen atom. Such compounds include phenyl, and substituted phenyl such as lower alkyl substituted phenyl. These compounds include tolyl, ethylphenyl, triethylphenyl, halophenyl such as chlorophenyl, and nitrophenyl. The term "heterocyclic" refers to pyrrolyl, pyridyl, furfuryl, and the like. The aryl or heterocyclic groups generally contain up to about 15 carbon atoms.

The preferred ferrocene and its derivatives have the following formula:

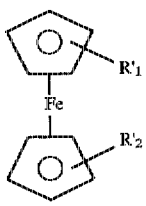

where $R'_1$ and $R'_2$ are independent and are selected from the group consisting of H and an alkyl group having from 1 to 8 carbon atoms, preferably 1 to 6 carbon atoms, most preferably 1 to 4 carbon atoms. Dicyclopentadienyl iron is commonly referred to as "ferrocene". Hence the compounds of the above formula I are considered to be ferrocene and its derivatives. The preferred compounds of formula I include dicyclopentadienyl iron, 1,1'-dimethylcyclopentadienyl iron, 1,1'-diethylcyclopentadienyl iron, 1,1'-dibutyldicyclopentadienyl and diindenyl ferrocene. These compounds are commercially available and may be prepared by processes well known in the art.

In one embodiment, the liquid hydrocarbon is essentially normal paraffinic and may comprise one or more linear alkane constituents. For purposes of the present invention the liquid hydrocarbon may have the following composition and properties:

|  | Range (wt. %) | Preferred Range (wt. %) | Most Preferred Range (wt. %) |
| --- | --- | --- | --- |
| n-alkanes | 75 to 100 | 90 to 100 | 95 to 100 |
| carbon atoms in n-alkane mixture | $C_6$ to $C_{16}$ | $C_7$ to $C_{14}$ | $C_7$ to $C_{12}$ |
| aromatic content | less than 5.0 | less than 1.0 | less than 0.1 |
| other constituents | 0 to 25 | 0 to 10 | 0 to 5 |

The ranges specified above are interchangeable. The "other constituents" include isoalkanes and cycloalkanes.

Normal paraffins (n-alkanes) are preferred in the hydrocarbon compositions of the invention. Cycloparaffins are also acceptable but not quite as usable as the normal paraffins. Isoparaffins usually detract from the invention composition, producing somewhat more smoke, but may be present in alkane mixtures.

The invention embodiments include hydrocarbon compositions with small amounts of alkanes, preferably n-alkanes, less preferably cycloalkanes, and must less desirably isoparaffins. One embodiment has 10 wt % or more alkanes. The $C_8$-$C_{16}$ alkanes, especially n-alkanes are preferred. The n-alkane and n-alkane mixtures specified above not only produce less soot and other undesirable contaminants, but exhibit the flash point range convenient for fire training. N-alkanes below six carbon atoms are too volatile and are difficult to control and extinguish. N-alkanes above 16 carbon atoms are difficult to ignite and are too easy to extinguish.

The liquid composition may be prepared by dissolving or dispersing the ferrocene compound in the liquid hydrocarbon at a concentration of 0.1 to 10 wt. %, preferably 0.2 to 5 wt. % and most preferably 0.25 to 1.0 wt. %. The solution or dispersion should form a stable uniform composition.

The liquid composition may be used in firefighter training by the following process:
1. The desired amount of the composition is introduced by whatever means into an open pit or container and/or on a substrate such as wood, concrete, gravel, etc., and/or on another material such as water;
2. The composition is ignited and burned until a flame of the desired intensity is reached (with or without introduction of additional liquid composition); and
3. Fire fighting activities are carried out on the flame, the objective of which is generally to extinguish or control the fire.

In distinguishing the present invention over prior art uses of ferrocene in hydrocarbon carriers, it is important to realize that the composition is not generally useful as a commercial fuel or solvent because of limited supply. In fact, tests have demonstrated that commercial fuels and solvents are not suitable because they generate too much soot and other undesirable combustion products. The liquid composition of the present invention is a special formulation having a unique composition and properties, making it ideally suited for fire training uses.

EXAMPLES

Laboratory tests were carried out on various fuels and solvents to determine soot and particulate generation. The test procedure was as follows: A known quantity of fuel or solvent was placed in a crucible and the crucible placed below an inverted funnel system fitted with a filter and attached to a vacuum pump. The fuel or solvent was ignited and all soot and particulates collected on the filter by applying a vacuum to the inverted funnel system. Soot produced is measured by weight and related to the amount of fuel or solvent burned to provide a percent soot.

Table I presents the results using the indicated fuels and solvents, typical of those used in prior firefighter training:

TABLE I

| Fuel or Solvent | Wt. % Soot | |
|---|---|---|
| | No Ferrocene | With Ferrocene |
| Jet fuel (JP4) | 8.65 | 5.26[2] |
| Kerosene | 10.12 | 8.94[2] |
| Varsol | 9.74 | 8.51[2] |
| Xylene | 16.50 | 3.49[2] |
| Toluene | 15.50 | 1.97[1] |

[1] 2 wt. %
[2] 0.25 wt. %

Similar tests were performed using branched alkanes and cyclic hydrocarbons. The results of these tests are presented in Table II.

TABLE II

| Hydrocarbon | Soot (wt. %) | |
|---|---|---|
| | No Ferrocene | With Ferrocene[1] |
| Isooctane | 6.23 | 4.57 |
| Isodecanes and Isoundecanes | 4.96 | 3.21 |
| Isododecanes | 4.85 | 3.20 |

[1] 0.25 wt. %

Similar tests were conducted using the liquid composition of one of the embodiment of the present invention. The results are presented in TABLE III.

TABLE III

| Composition | Soot (wt. %) | |
|---|---|---|
| | No Ferrocene | With Ferrocene |
| Octane | 1.77 | 1.15 |
| Nonane | 1.47 | 0.85 |
| Decane | 1.77 | 0.86 |
| Dodecane | 2.04 | 0.71 |
| Tetradecane | 2.01 | 0.62 |
| Hexadecane | 1.77 | 0.55 |

[1] 0.25 wt. %

A comparison of the TABLE III data with the data of TABLES I and II reveals the dramatic reduction in soot using the liquid composition of one preferred embodiment the present invention. The comparative results are summarized in TABLE IV.

TABLE IV

| Compound | Avg. Soot wt. % | |
|---|---|---|
| | No Ferrocene | With Ferrocene |
| Fuels and Solvents | 12.1 | 6.55 |
| Isoalkanes | 5.35 | 3.66 |
| Composition of present invention | 1.85 | 0.65 |

TABLE IV indicates that the composition of the present invention results in from 88 to 95 wt. % reduction over fuels, solvents, and isoalkanes.

A separate series of larger laboratory experiments, "pool fires", were carried out to determine the nature and quantity of selected non-soot, non-particulate products of combustion. The procedure was as follows. The liquid material to be burned was placed in a 0.9 meter diameter pan with a 100 mm lip height. The pan was set on a flat platform mounted on a load cell. A hood (2.4 meters by 3.0 meters) was positioned above the pan to collect the combustion products of the pool fire. The bottom edge of the hood was approximately 2.5 meters above the test pan and the hood was connected through a 1.2 $m^2$ plenum to a 13 meters long 0.56 meter diameter horizontal exhaust duct. The downstream end of the exhaust duct contained a fan with a capacity of at least 2.0 M3/S.

Mass loss of the fuel during the tests was monitored by the load cell. Three sampling ports were installed 9.5 meters downstream from the center of the hood and these were used for taking soot and exhaust gas samples. For each test, 10 kg (approximately 12 L) of fuel was used and this was sufficient to allow 10 minutes of steady burning.

Soot samples taken from these test burns were subjected to Soxhlet extraction for a period of 48 hours. 150 mL of benzene was used in each case and this was subsequently reduced down to 4 mL following the extractions. Each solution was treated with a deuterated phenanthrene-d10 standard in a concentration of 10 ppm and then equal quantities of each solution were injected into a Gas Chromatograph/Mass Spectrophotometer (GC/MS) for analysis.

TABLE V presents the results of the experiment showing the relative amounts of polycyclic aromatic hydrocarbons (PAH's) found in the soot samples from JP4 jet fuel and a normal paraffin mixture containing ferrocene.

TABLE V

| Chemical | JP4 | Normal Dodecanes[1] + 1.0 wt. % Ferrocene | % Reduction |
|---|---|---|---|
| Acenaphthalene | 1880 | 496 | 74 |
| Acenaphthalene | 423 | 98 | 77 |
| Fluorene | 381 | 172 | 55 |
| Phenanthrene | 9027 | 1543 | 83 |
| Anthracene | 1200 | 199 | 83 |
| Fluoranthrene | 8015 | 302 | 96 |
| Pyrene | 7630 | 290 | 96 |
| Benzo(a)anthracene | 956 | 0 | 100 |
| Chrysene/Triphenylene | 1214 | 231 | 81 |
| Benzo(b)fluoranthrene | 803 | 0 | 100 |
| Benzo(k)fluoranthrene | 293 | 0 | 100 |
| Benzo(e)pyrene | 610 | 133 | 78 |
| Benzo(a)pyrene | 632 | 0 | 100 |
| Perylene | 0 | 0 | — |
| Indeno(1,2,3-cd)pyrene | 310 | 0 | 100 |
| Dibenzo(a,h)anthracene | 0 | 0 | — |
| Benzo(ghi)perylene | 419 | 0 | 100 |

[1] mixture of linear hydrocarbons with an average carbon number of 12 but including carbon numbers from 10 to 14.

As can be seen from the data in TABLE V, the normal paraffin ferrocene mixture provides substantial reductions in the amounts of PAH's produced in the burn process. Overall the normal paraffin-ferrocene mixture provided an average 88% reduction in 3 ring and large PAH'S.

Exhaust gas samples taken from the experiment described above were analyzed for volatile organic compounds and formaldehyde using Tenax tubes and dinitrophenylhydrazine sorption tubes.

TABLE VI presents the results of the experiment showing the volatile organic compounds (VOC's) found in the combustion zone for test burns of JP4 jet fuel and a normal paraffin mixture containing ferrocene.

TABLE VI

| Chemical | JP4 | Normal Dodecanes[1] + 1.0 wt. % Ferrocene | % Reduction |
|---|---|---|---|
| Benzene | 290 | 10 | 96 |
| Toluene | 48 | 9 | 82 |
| Formaldehyde | 135 | 52 | 62 |

[1] mixture of linear hydrocarbons with an average carbon number of 12 but including carbon numbers from 10 to 14.

As can be seen from the data in TABLE VI, the normal paraffin ferrocene mixture provides substantial reductions in the amounts of VOC's produced in the burn process with a 96% reduction in benzene and an 82% reduction in toluene. The data in TABLE VI also show a 62% reduction in formaldehyde production in the burn process.

One embodiment of the invention combines 0.25–0.5 wt % ferrocene with a mixed alkane composition of predominantly normal paraffins. Such materials are available from Exxon Chemical Company as: Exxsol® brand heptane comprising 4 wt. % cycloheptane, less than 0.01 wt. % aromatics and 96 wt. % mixed iso- and n-heptane plus Norpar® brand 12 solvent comprising less than 0.01 wt. % aromatics and 100% normal paraffins.

In another preferred embodiment of the invention, about 0.25 wt. % ferrocene is combined with a mixed alkane composition of predominantly normal paraffins. Such materials are available from Exxon Chemical Company as: Exxsol® brand D-40 dearomatized aliphatic having about 42 wt. % normal and iso paraffins, 57 wt. % cycloparaffins and 0.4 wt. % aromatics.

Such predominantly normal paraffinic compositions with 0.25 wt. % ferrocene, when ignited in a firefighter training process, exhibit visual smoke ratings of about 3 or less, with a diesel fuel-ferrocene composition exhibiting a 10 rating and the linear hydrocarbon mixture with ferrocene of Table V exhibiting a 1 rating (very low smoke).

During the training of firefighters in the art of extinguishment and control of fires in open pits or bermed areas, water is sometimes used in a manner in which it is placed in the pit or bermed area and the liquid to be burned then placed on top of the water and ignited. In such practice, contamination of the water by residual combustion products presents environmental problems and costs are incurred to clean the water prior to its reuse or disposal. In experiments similar to the one described above which were carried out in the presence of water under the burning liquid, substantially less residue was observed from fires using the normal paraffin ferrocene mixture compared to rites using conventional fuels. Use of the normal paraffin ferrocene mixture will result in less waste, and lower water treatment and disposal costs.

The compositions of the invention permit reduced use of volume of composition consumed during training. From the above results, it is clear that the ferrocene-n-paraffin mixture, according to this invention, is unique and superior to conventional fuels and fuel additive combinations because of (a) the extremely low levels of soot and particulate produced during burning; (b) the dramatic reduction in the amount of polycyclic aromatic hydrocarbons produced during burning; (c) the significant reduction in the amount of volatile organic components, especially PNA's, produced during burning; (d) the reduction in the amount of formaldehyde produced during burning; (e) the reduction in the amount of and undesirable nature of the residue left after completion of the burning; (f) reduction of benzene emissions; (g) reduced volatile organics before combustion; and (h) lower ED-50 levels (ED-50 is the effective dilution at which 50% of the population would notice an odor in the atmosphere).

In a preferred embodiment of the invention, the liquid composition comprises:

(a) a liquid hydrocarbon containing less than 5 wt. % aromatics, based on said liquid hydrocarbon, said liquid hydrocarbon comprising at least 75 wt. % of an n-alkane or a mixture of n-alkanes having from 6 to 16 carbon atoms; and (b) an effective amount of a volatile iron compound dissolved or dispersed in the hydrocarbon liquid to reduce the soot content of the hydrocarbon liquid upon combustion compared with no volatile iron compound in the hydrocarbon liquid, said volatile iron compound being selected from the group consisting of iron pentacarbonyl, ferrocene, and ferrocene derivatives.

In a more preferred embodyment, the volatile iron compound is a ferrocene compound, or a ferrocene derivative having the following formula:

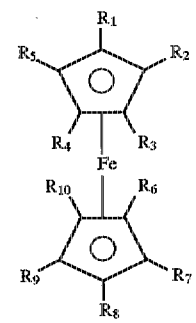

where $R_1$, $R_2$, $R_3$, $R_4$, $R_5$, $R_6$, $R_7$, $R_8$, $R_9$, and $R_{10}$ are independent of each other and are selected from the group consisting of H, alkyl, cycloalkyl, aryl, and heterocyclic functional groups;

Preferably, the concentration of the volatile iron compound in the hydrocarbon liquid ranges from 0.1 wt. % to 10 wt. % based on the combined wt. of the liquid and the volatile iron compound.

More preferably, the hydrocarbon liquid contains less than 1% aromatics and comprises at least 95% of the n-alkanes.

Most preferably, the hydrocarbon liquid contains less than 0.1 wt. % aromatics.

Preferably, the liquid hydrocarbon contains from 0 to 25 wt. % isoparaffins and cycloparaffins.

Preferably, the liquid hydrocarbon has a flash point of between 0° F. and 200° F.

In another preferred embodiment of the invention, the liquid composition comprises:

(a) from 95 to 99.9 wt. % of a liquid hydrocarbon containing less than 1 wt. % aromatics and being composed of from 90 to 100% of an n-alkane or n alkane mixture having from 6 to 16 carbon atoms, said liquid hydrocarbon having a flash point of between 30° and 150° F.; and (b) from 0.1 to 5 wt. % of ferrocene compound having the following formula:

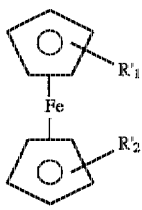

where $R_1'$ and $R_2'$ are independent of each other and are selected from the group consisting of H and an alkyl group having from 1 to 8 carbon atoms.

Preferably, the liquid hydrocarbon contains less than 0.1 wt. % aromatics.

Preferably, the composition upon combustion produces less than 1.0 wt. % soot.

Preferably, the n-alkane has an average C number of between 7 and 14.

More preferably, the average C number is between 8 and 12.

Also disclosed is a fire training method which comprises:
(a) introducing by whatever means the liquid composition of the invention into an open pit or container; and
(b) igniting the liquid composition and permitting it to burn to the desired flame intensity.

Preferably, the liquid composition is disposed on water in the pit or container.

Preferably, burning of the liquid composition produces less than 1.0 wt. % soot.

Preferably, the liquid composition has a flash point of between 0° F. and 200° F.

We claim:

1. A low smoke composition comprising a liquid hydrocarbon and an amount of a volatile iron compound effective to reduce the soot content of said liquid hydrocarbon, when said liquid hydrocarbon is combusted, said composition having a flash point of 20° F. to 125° F. and a smoke point of at least 50 mm.

2. The composition of claim 1, wherein said volatile iron compound is selected from the group consisting of iron pentacarbonyl, ferrocene and ferrocene derivatives.

3. The composition of claim 2 wherein the volatile iron compound is a ferrocene compound or derivative of formula:

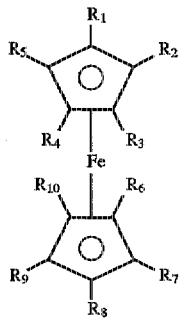

wherein the R's are independently selected from H, alkyl, cycloalkyl, aryl, and heterocyclic functional groups.

4. The composition of claim 2 wherein said volatile iron compound is present at 0.1–10.0 wt. %.

5. The composition of claim 1, wherein said liquid hydrocarbon comprises less than 1.0 wt. % aromatics.

6. The composition of claim 5, wherein said liquid hydrocarbon comprises less than 0.1 wt. % aromatics.

7. The composition of claim 5, wherein said volatile iron compound is selected from the group consisting of iron pentacarbonyl, ferrocene and ferrocene derivatives.

8. The composition of claim 1, wherein said liquid hydrocarbon comprises at least 10 wt. % of one or more alkanes.

9. The composition of claim 8, wherein said liquid hydrocarbon comprises at least 75 wt. % of said alkanes.

10. The composition of claim 8 wherein said alkanes are n-alkanes or cycloalkanes.

11. The composition of claim 8 wherein said alkanes are $C_8$–$C_{16}$.

12. The composition of claim 8, wherein said volatile iron compound is selected from the group consisting of iron pentacarbonyl, ferrocene and ferrocene derivatives.

13. The composition of claim 8, wherein said liquid hydrocarbon comprises less than 1.0 wt. % aromatics.

14. The composition of claim 12, wherein said liquid hydrocarbon comprises less than 1.0 wt. % aromatics.

15. The composition of claim 1 producing upon combustion, soot in an amount less than 1.0 wt. % of the composition consumed.

16. A process for producing a low smoke fire for conducting of firefighter training exercises, comprising:

igniting a hydrocarbon composition having a smoke point of at least 50 mm.

17. The process of claim 16 wherein said composition has a flash point of 20°–125° F.

18. A process for producing a low smoke fire for conducting of firefighter training exercises, comprising:

igniting a hydrocarbon composition having a flash point of 20° F. to 125° F. and a smoke point of at least 50 mm.

19. The process of claim 16 wherein the burning composition produces soot in an amount less than 1.0 wt. % of the composition consumed.

20. The process of claim 16 wherein said composition contains a smoke-reducing amount of a volatile iron compound.

21. The process of claim 16 wherein said composition comprises at least 10 wt. % alkanes.

* * * * *